(12) United States Patent
Arnault et al.

(10) Patent No.: US 12,104,650 B2
(45) Date of Patent: Oct. 1, 2024

(54) BEARING DEVICE WITH INTEGRATED ELECTRICAL INSULATION, IN PARTICULAR FOR AN ELECTRIC MOTOR OR MACHINE

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 29 days.

(21) Appl. No.: 18/084,812

(22) Filed: Dec. 20, 2022

(65) Prior Publication Data

US 2023/0220881 A1    Jul. 13, 2023

(30) Foreign Application Priority Data

Jan. 10, 2022 (FR) ...................................... 2200139

(51) Int. Cl.
| | |
|---|---|
| *F16C 19/06* | (2006.01) |
| *F16C 19/52* | (2006.01) |
| *F16C 33/58* | (2006.01) |
| *F16C 35/077* | (2006.01) |

(52) U.S. Cl.
CPC ............ *F16C 35/077* (2013.01); *F16C 19/06* (2013.01); *F16C 19/52* (2013.01); *F16C 33/585* (2013.01); *F16C 2380/26* (2013.01)

(58) Field of Classification Search
CPC ........ F16C 19/06; F16C 19/52; F16C 33/585; F16C 35/077; F16C 2380/26; H02K 5/1732; H02K 5/1735; H02K 5/1737
See application file for complete search history.

(56) References Cited

U.S. PATENT DOCUMENTS

| | | | |
|---|---|---|---|
| 2,283,839 A | | 5/1942 | Wright |
| 3,447,846 A | | 6/1969 | Marsh |
| 5,059,041 A | * | 10/1991 | Watanabe ............. F16C 33/586 |
| | | | 384/536 |
| 11,002,315 B2 | * | 5/2021 | Stephan .................. F16C 33/60 |
| 2010/0326788 A1 | | 12/2010 | Kamm et al. |
| 2011/0038577 A1 | | 2/2011 | Horling et al. |

(Continued)

FOREIGN PATENT DOCUMENTS

| | | |
|---|---|---|
| CN | 103780001 A | 5/2014 |
| DE | 102007060968 A1 | 7/2008 |

(Continued)

OTHER PUBLICATIONS

JP20132419848A_DESCRIPTION.*

(Continued)

*Primary Examiner* — Phillip A Johnson
(74) *Attorney, Agent, or Firm* — J-TEK LAW PLLC; Scott T. Wakeman; Mark A. Ussai (57) ABSTRACT

A bearing device includes a first ring and a second ring mounted for relative rotation and an insulating sleeve including a socket and an electrically insulating liner. The socket has at least one recess, and the liner has at least one protrusion extending into each of the at least one recess. The liner is overmolded on the second ring and on the socket such to connect the second ring to the socket.

20 Claims, 4 Drawing Sheets

(56) References Cited

U.S. PATENT DOCUMENTS

| | | | |
|---|---|---|---|
| 2014/0111046 A1 | | 4/2014 | Murikipudi et al. |
| 2015/0322790 A1 | | 11/2015 | Yao et al. |
| 2019/0323558 A1 | | 10/2019 | Stephan |
| 2020/0047795 A1 | | 2/2020 | Falossi et al. |
| 2023/0220874 A1 | | 7/2023 | Arnault et al. |
| 2023/0220882 A1 | | 7/2023 | Arnault et al. |
| 2023/0223813 A1 | | 7/2023 | Arnault et al. |
| 2024/0026926 A1 | | 1/2024 | Chollet |

FOREIGN PATENT DOCUMENTS

| | | | |
|---|---|---|---|
| DE | 102007060906 B3 | | 10/2009 |
| DE | 102020106338 A1 | | 9/2021 |
| EP | 0417744 A2 | | 3/1991 |
| EP | 0417744 B1 | | 1/1995 |
| EP | 2258637 A2 | | 12/2010 |
| JP | H04210124 A | | 7/1992 |
| JP | H1037949 A | * | 2/1998 |
| JP | 2005320983 A | | 11/2005 |
| JP | 2008057568 A | | 3/2008 |
| JP | 2013241948 A | * | 12/2013 |
| JP | 2019138467 A | | 8/2019 |
| WO | 2019156050 A1 | | 8/2019 |

OTHER PUBLICATIONS

Unpublished U.S. Appl. No. 18/084,824, Benoit Arnault, filed Dec. 20, 2022.
Unpublished U.S. Appl. No. 18/084,834, Benoit Arnault, filed Dec. 20, 2022.
Unpublished U.S. Appl. No. 18/084,840, Benoit Arnault, filed Dec. 20, 2022.
Unpublished U.S. Appl. No. 18/084,824.
Unpublished U.S. Appl. No. 18/084,834.
Unpublished U.S. Appl. No. 18/084,840.
Written Opinion and Search Report from the French Patent Office mailed Aug. 29, 2022 in related French application No. FR2200139, and translation thereof.
Written Opinion and Search Report from the French Patent Office mailed Aug. 29, 2022 in related French application No. FR2200141, and translation thereof.
Written Opinion and Search Report from the French Patent Office mailed Aug. 29, 2022 in related French application No. FR2200142, and translation thereof.
Written Opinion and Search Report from the French Patent Office mailed Aug. 29, 2022 in related French application No. FR2200144, and translation thereof.

* cited by examiner

BEARING DEVICE WITH INTEGRATED ELECTRICAL INSULATION, IN PARTICULAR FOR AN ELECTRIC MOTOR OR MACHINE

CROSS-REFERENCE

This application claims priority to French patent application no. 2200139, filed on Jan. 10, 2022, the contents of which are fully incorporated herein by reference.

TECHNOLOGICAL FIELD

The present disclosure is directed to the field of bearings used in electric motors, electric machines and associated equipment.

BACKGROUND

In an electric motor or machine, at least one rolling bearing is mounted between the housing of the electric motor or machine and the rotary shaft so as to support this shaft. In operation, when the shaft is rotating, a difference in electrical potential can arise between the shaft and the housing of the electric motor or machine. This can cause an electric current to flow between the inner ring of the rolling bearing, which is rigidly secured to the shaft, and the outer ring of the rolling bearing, which is rigidly secured to the housing.

The electric current passing through the components of the rolling bearing can damage these components, in particular the rolling elements and the raceways formed on the inner and outer rings. The electrical discharge can also give rise to an undesirable vibration. To overcome these drawbacks, it is known practice to use ceramic rolling elements instead of steel rolling elements (which steel rolling elements are generally made from the same steel as the bearing rings).

Bearings having steel rings and ceramic rolling elements are generally referred to as "hybrid rolling bearings." However, such a hybrid rolling bearing is relatively expensive. It would therefore be desirable to provide a simple and inexpensive way to address the foregoing problems.

SUMMARY

The disclosure is directed to a bearing device comprising a bearing having a first ring and a second ring that can rotate relative to one another. According to a general feature, the device further comprises at least one insulating sleeve mounted on the second ring of the bearing. The insulating sleeve has a socket and an insulating liner (lining) interposed radially between the second ring of the bearing and the socket. The insulating liner is overmolded on the second ring and on the socket such that the liner is materially bonded to the second ring and the socket. The insulating liner is made of an electrically insulating material.

According to another general feature, the socket has at least one recess and a protuberance (protrusion) extends into the at least one recess from a body of the liner to attach the liner to the socket. The protrusion has a shape complementary to a shape of the recess. There is therefore provided a bearing or a bearing device with integrated electrical insulation which is inexpensive compared to conventional hybrid rolling bearings. Moreover, the device is easy to manufacture and to assemble in the associated electric motor or machine.

Furthermore, the insulating liner is not exposed to impacts as it is arranged radially between the second ring of the bearing and the socket. Moreover, if the insulating liner is made of synthetic material or elastomeric material, it makes it possible to make the device less sensitive to temperature changes.

Moreover, because the insulating liner is overmolded, it is attached to the second ring and to the socket by material bonding without any additional elements or modifications to the second bearing ring. It is thus possible to use a bearing having standard first and second rings. This reduces the cost of the device.

The provision of one or more recesses on the socket further enhances the rigid securing to the insulating liner in so far as the attachment protuberance or protuberances are formed inside this recess or these recesses during overmolding. The risk of relative movement between the insulating liner and the socket in the axial and circumferential directions is especially limited in particular in the event of temperature changes.

In one particular embodiment, the recess or recesses are formed in the radial thickness of the socket, that is, in or through a cylindrical side wall of the socket. This recess or these recesses may pass through the radial thickness of the socket. Alternatively or in combination, this recess or these recesses may be blind.

The socket comprises two opposite end faces axially delimiting the socket. According to a first design, the recess or recesses extend from one of the two end faces of the socket axially towards the other end face. The recess or recesses may open out on the other face or remain axially at a distance from the latter. According to a second design, the recess or recesses of the socket are located axially at a distance from the two end faces. In other words, the recess or recesses do not open out on the end faces of the socket.

In one particular embodiment, the socket has, at an axial end, a rim or flange which is bent axially and bears against the insulating liner. This rim of the socket makes it possible to further limit the risk of relative movement between the socket and the insulating liner at least in the axial direction, in particular in the event of temperature changes.

In one particular embodiment, the socket is made of metal. The socket can thus be easily machined to a predetermined radial tolerance.

The second ring of the bearing comprises an outer surface and an inner surface opposite the outer surface, which delimit the radial thickness of the second ring. The insulating liner may be overmolded radially on the socket and at least on one of the inner and outer surfaces of the second ring.

In one embodiment, the insulating liner covers the whole of the radially inner or radially outer surface of the second ring of the bearing. In this case, the insulating liner entirely covers the surface of the second ring in the axial direction and in the circumferential direction.

The second ring of the bearing comprises two opposite end faces axially delimiting the radially inner and outer surfaces. In one embodiment, the insulating liner may be overmolded at least partially on one of the end faces of the socket or the second ring.

According to a first embodiment, the socket delimits the outer surface of the device. In this case, the second ring is the outer ring of the bearing. According to a second alternative embodiment, the socket delimits the inner surface of the device. In this case, the second ring is the inner ring of the bearing.

In one particular embodiment, the bearing comprises at least one row of rolling elements arranged between raceways of the first and second rings. The rolling elements may be made of metal. The disclosure also relates to an electric motor comprising a housing, a shaft and at least one bearing device as defined above, mounted radially between the housing and the shaft.

BRIEF DESCRIPTION OF THE DRAWINGS

The present disclosure will be better understood upon studying the detailed description of embodiments, given by way of the following non-limiting examples and illustrated by the appended drawings.

DETAILED DESCRIPTION

Figure 1:
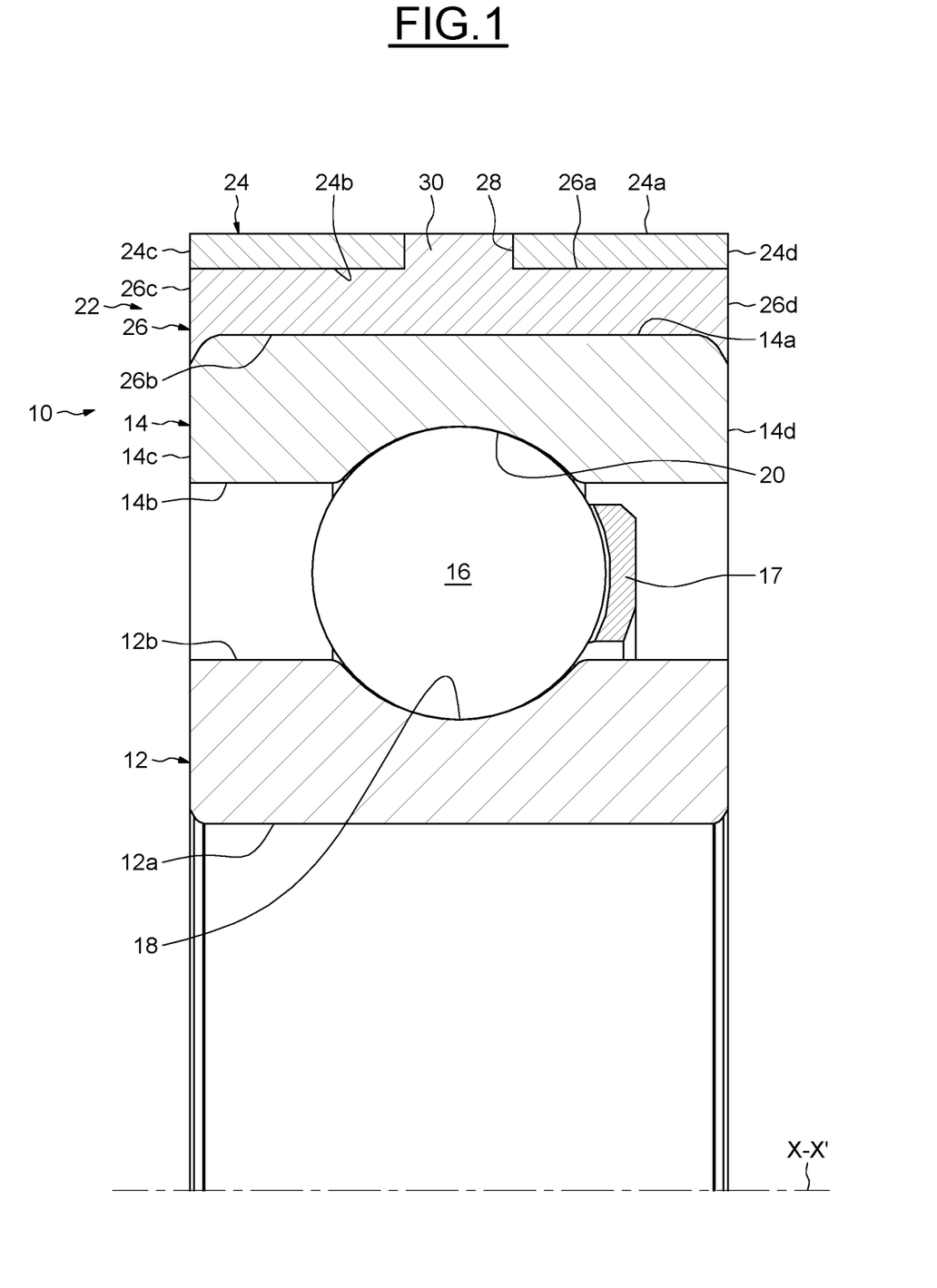
FIG. 1 is a sectional view of a bearing device according to a first embodiment of the present disclosure.

The bearing device shown in FIG. 1 comprises a bearing 10 having a first ring 12 and a second ring 14 that can rotate relative to one another about the rotational axis X-X' of the bearing. In the embodiment shown, the first ring 12 is the inner ring of the bearing and the second ring 14 is the outer ring.

As described in more detail below, the bearing device is designed in such a way as not to conduct electrical current. The bearing device has integrated electrical insulation.

The inner 12 and outer 14 rings of the bearing are concentric and extend axially along the rotational axis X-X' of the bearing. The inner 12 and outer 14 rings are solid and are made of steel.

In the embodiment shown, the bearing 10 also includes a row of steel rolling elements 16, in this case balls, interposed radially between the inner 12 and outer 14 rings. The bearing 10 also includes a cage 17 for maintaining a regular circumferential spacing between the rolling elements 16. The bearing 10 may also have seals or sealing flanges.

The inner ring 12 has a cylindrical bore 12a, a cylindrical axial outer surface 12b radially opposite the bore, and two radially opposite end faces (not referenced) axially delimiting the bore and the outer surface. The bore 12a and the outer surface 12b delimit the radial thickness of the inner ring 12. The inner ring 12 also includes an inner raceway 18 for the rolling elements 16 which is formed on the outer surface 12b. The raceway 18 is directed radially outwards.

The outer ring 14 comprises a cylindrical axial outer surface 14a, a cylindrical bore 14b radially opposite the outer surface 14a, and two opposite radial end faces 14c, 14d axially delimiting the bore and the outer surface. The outer surface 14a and the bore 14b delimit the radial thickness of the outer ring 14. The outer ring 14 also includes an outer raceway 20 for the rolling elements 16 which is formed on the bore 14b. The raceway 20 is directed radially inwards.

The bearing device also includes an electrically insulating sleeve 22 mounted on the outer ring 14. The insulating sleeve 22 is mounted on the outer surface 14a of the outer ring 14 and is rigidly secured to the outer ring 14. The insulating sleeve 22 includes a socket 24 and an insulating liner 26 (lining) interposed radially between the outer ring 14 and the socket 24. The insulating liner 26 may be overmolded on the outer ring 14 and/or on the socket 24.

The socket 24 is annular and extends axially. The socket 24 is made in one piece. The socket 24 has a cylindrical axial outer surface 24a, a cylindrical bore 24b radially opposite the outer surface 24a, and two opposite radial end faces 24c, 24d axially delimiting the bore and the outer surface. The outer surface 24a and the bore 24b delimit the radial thickness of the socket 24. The outer surface 24a of the socket delimits the outer surface of the bearing device 10. In other words, the outer surface 24a of the socket 24 defines the outer diameter of the bearing device 10.

The socket 24 has a plurality of radially extending recesses 28 formed in its radial thickness. The recesses 28 are in this case identical to one another and are formed as radially extending through openings. Each recess 28 extends from the bore 24b and opens out on the outer surface 24a. The recesses 28 are in the form of holes.

Figure 2:
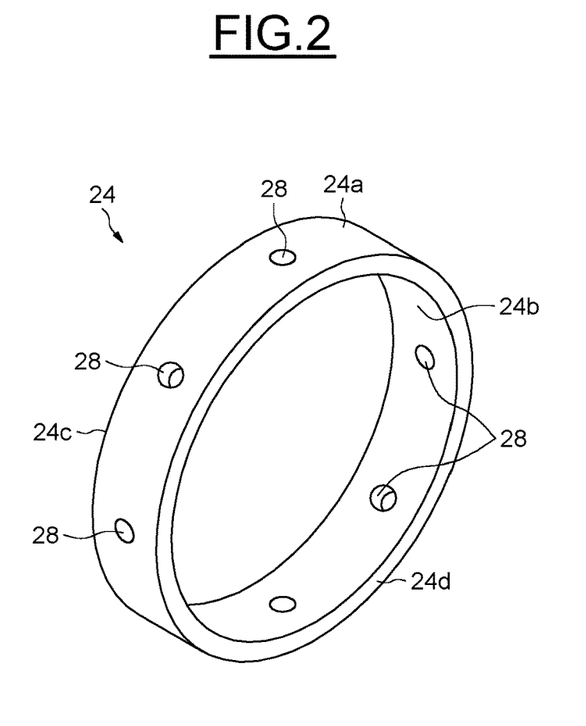
FIG. 2 is a perspective view of a socket of the bearing device of FIG. 1.

As can be partially seen in FIG. 2, the recesses 28 are regularly circumferentially spaced apart from one another. Alternatively, it could be possible to provide an irregular circumferential spacing. In another variant embodiment, a single recess 28 could be provided.

In the embodiment shown, the recesses 28 are centered relative to a median radial plane of the socket. Alternatively, the recess or recesses 28 could be offset relative to this median radial plane. In the embodiment shown, the recesses 28 are in the form of circular holes. As a variant, the recesses 28 may have other shapes, for example oval or polygonal such as square, rectangular, etc.

The socket 24 is advantageously made of metal, preferably steel. Thus, the outer surface 24a of the socket can be easily machined to a predetermined tolerance if needed. The socket 24 may be obtained from a sheet metal blank by cutting, pressing and rolling. Alternatively, the socket 24 may be obtained from a tube or from forged and/or rolled and/or sintered blanks. The recesses 28 may for example be formed by punching.

The insulating liner 26 is made of an electrically insulating material. The insulating liner 26 may for example be made of a synthetic material, such as polyether ether ketone (PEEK) or nylon-46 (PA46), or may be made of an elastomeric material such as rubber.

Referring once again to FIG. 1, the insulating liner 26 extends radially between the outer surface 14a of the outer ring and the bore 24b of the socket. The insulating liner 26 covers the outer surface 14a of the outer ring. The insulating liner 26 in this case entirely covers the outer surface 14a with respect to the axial and circumferential directions. The insulating liner 26 also covers the bore 24b of the socket. The insulating liner 26 also in this case entirely covers the bore 24b with respect to the axial and circumferential directions.

As stated above, the insulating liner 26 is overmolded on the outer ring 14 of the bearing and on the socket 24. The insulating liner 26 is overmolded on the outer surface 14a of the outer ring 14 and on the bore 24b of the socket 24.

The insulating liner 26 is annular and extends axially. The insulating liner 26 comprises a cylindrical axial outer surface 26a, a cylindrical bore 26b radially opposite the outer surface 26a, and two opposite radial end faces 26c, 26d axially delimiting the bore and the outer surface. The outer surface 26a and the bore 26b delimit the radial thickness of the insulating liner 26. The outer surface 26a is in radial contact with the bore 24b of the socket. The bore 26b is in radial contact with the outer surface 14a of the outer ring.

In the embodiment shown, the faces 14c, 26c, 24c of the outer ring, of the insulating liner and of the socket are coplanar, and the faces 14d, 26d, 24d of the outer ring, of the insulating liner and of the socket are coplanar.

Alternatively, it is possible to provide other arrangements. For example, the insulating liner 26 could have an axial dimension smaller than that of the outer ring and be axially set back from the faces 14c, 14d of the outer ring. Alternatively, the insulating liner 26 could have an axial dimension larger than that of the outer ring and protrude axially beyond the faces 14c, 14d of the outer ring. In this case, the insulating liner 26 may at least partially cover these faces 14c, 14d. As a variant, the insulating liner 26 could at least partially cover the faces 24c, 24d of the socket. In another alternative or in combination, the socket 24 could protrude axially beyond the insulating liner 26 relative to the faces 26c and 26d, or be axially set back from these faces.

The insulating liner 26 also comprises a plurality of protuberances 30 extending radially outwards from the outer surface 26a and each is received in one of the recesses 28 of the socket. Each protuberance 30 has a shape complementary to the associated recess 28. Each protuberance 30 contacts the inner edge of the associated recess 28. The protuberances 30 extend into the recesses 28 and are flush with the outer surface 24a of the socket. The protuberances 30 are formed on the outer surface 26a of the insulating liner 26 during overmolding of the insulating liner 26.

A method of producing the bearing device is described below.

In a first step, the bearing 10 and the socket 24 are mounted inside a mold which is provided for overmolding the insulating liner 26 onto the bearing 10 and the socket 24. In this position mounted inside the mold, the socket 24 is radially spaced from the outer ring 14 of the bearing.

Next, during a second successive step, the insulating liner 26 is overmolded on both the outer ring 14 of the bearing and the socket 24. As stated above, the protuberances 30 of the insulating liner which promote attachment to the socket 24 are formed during this step.

Lastly, the bearing device, which is in the form of a unitary assembly, is removed from the mold.

In this embodiment, the recesses 28 of the socket are located axially at a distance from its two end faces 26c, 26d. As a variant, it is possible to provide other arrangements.

Figure 3:
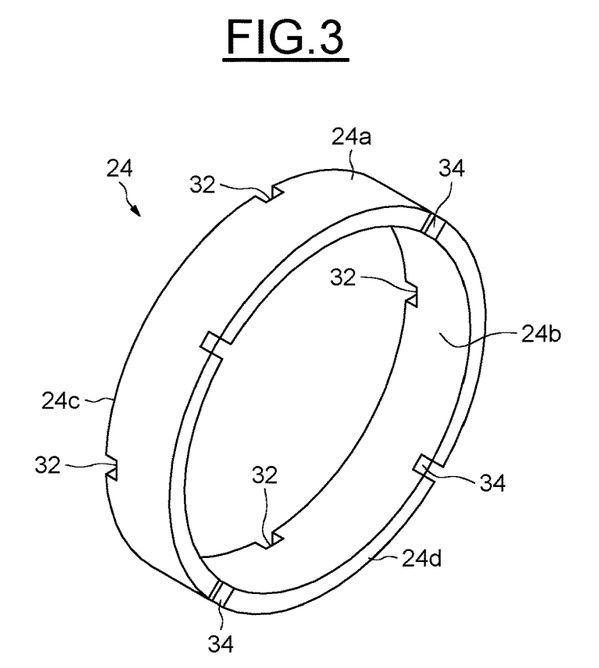
FIG. 3 is a perspective view of a socket of a bearing device according to a second embodiment of the disclosure.

For example, in the embodiment shown in FIG. 3, in which identical elements bear the same reference numbers, the socket 24 has a first group of recesses 32 on one axial side of the socket, and a second group of recesses 34 on the opposite axial side of the socket. In the embodiment shown, the recesses 32, 34 are identical to one another. The recesses 32, 34 are formed in the radial thickness of the socket. Each recess 32, 34 extends radially from the bore 24b and opens out on the outer surface 24a. Each recess 32, 34 passes through the radial thickness of the socket 24 and is therefore is a through-recess.

The recesses 32 extend axially from the end face 24c of the socket towards the end face 24d. The recesses 34 extend axially from the end face 24d of the socket towards the end face 24c. The recesses 32, 34 have a limited axial dimension—that is, they have a recess bottom and do not extend completely from one axial side of the socket to the other. The recesses 32, 34 may be formed by cutting.

In the embodiment shown, the recesses 32, 34 on each side of the socket are regularly spaced apart from one another in the circumferential direction. Alternatively, it could be possible to provide irregularly circumferentially spaced recesses. In another variant embodiment, a single recess 32, 34 could be provided on each side of the socket.

In the embodiment shown, each recess 32 of a group is offset in the circumferential direction relative to the recesses 34 of the other group. It is possible to envisage, as a variant, an arrangement in which each recess 32 of a group is aligned in the circumferential direction with one of the recesses 34 of the other group.

In the embodiment shown, the recesses 32, 34 are in the form of rectangular holes or notches. As a variant, the recesses 32, 34 may have other shapes, for example other polygonal shapes or oval, etc.

As in the first example described, the insulating liner 26 includes a plurality of protuberances 30 formed during the overmolding of the insulating liner 26 to the socket 24 and the bearing ring 14, and each extends into one of the recesses 32, 34 and has a shape complementary to the associated recess.

Figure 4:
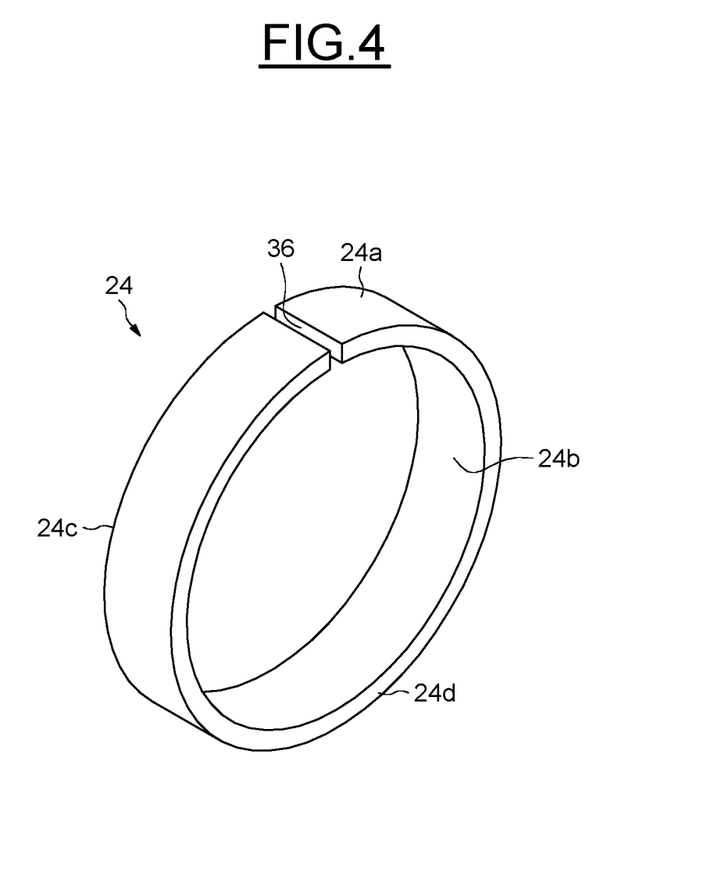
FIG. 4 is a perspective view of a socket of a bearing device according to a third embodiment of the disclosure.

In the embodiment shown in FIG. 4, the socket 24 has a recess 36 made in the form of a continuous axial slot which extends from the end face 24c and which opens out on the end face 24d. The recess 36 also passes through the radial thickness of the socket 24.

As in previous examples, the insulating liner of the device equipped with this socket comprises a protuberance formed during overmolding thereof and extends into the recess 36 and has a complementary shape.

In this embodiment, the recess 36 opens out axially on the two end faces 24c, 24d of the socket. Alternatively, the recess 36 could not open out on one of the end faces 24c, 24d—that is, the recess 36 could be centrally located between the end faces 24c, 24d and not extend as far as the end faces 24c, 24d. Moreover, in this example, the edges of the recess 36 are straight. Alternatively, these edges could have other shapes or be corrugated.

The recess 36 may be formed by cutting. Alternatively, the recess 36 may be formed during a shaping of the socket by rolling, or by rolling and bending of the circumferential free ends.

In another variant embodiment, the socket 24 be provided with one or more recesses in the form of grooves extending axially or helically.

Figure 5:
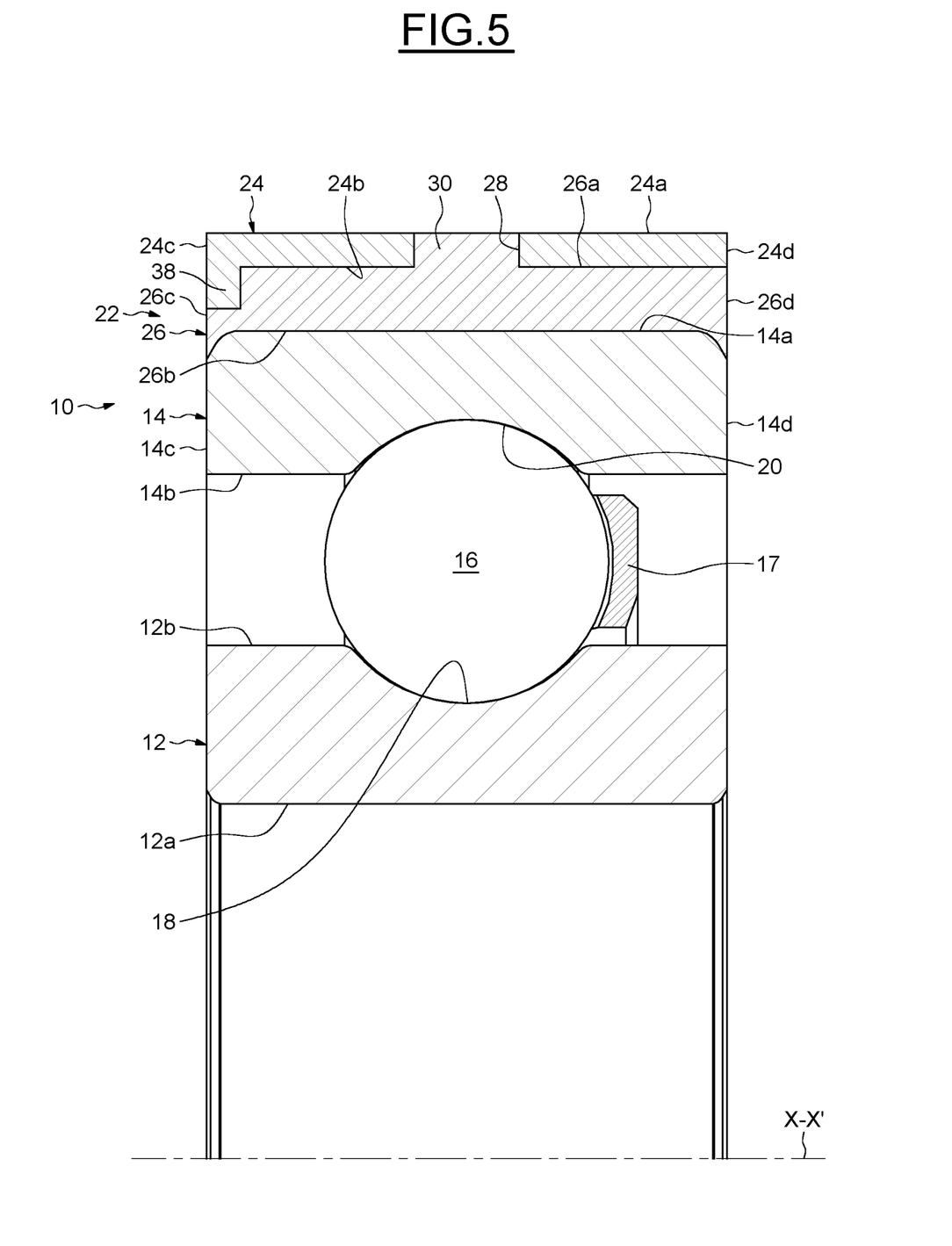
FIG. 5 is a sectional view of a bearing device according to a fourth embodiment of the disclosure.

The embodiment shown in FIG. 5, in which identical elements bear the same references as the earlier embodiments, differs from the first example in that the socket 24 comprises, at one axial end, a rim 38 (flange) axially bearing against the insulating liner 26 on the opposite side to the outer ring 14 of the bearing. The rim 38 extends radially inward from the axial end. The rim 38 protrudes radially inwards relative to the bore 24b of the socket. The rim 38 bears axially against an end portion 26c of the insulating liner. The rim 38 is formed by bending the socket 24. In this embodiment, the socket 24 is also made in one piece. The rim 38 may be of annular shape or alternatively be in the form of sectors spaced apart from one another in the circumferential direction. In this latter case, the rim 38 may formed by cutting the socket 24 axially and bending flaps formed by the cuts radially inwardly.

In this embodiment, the insulating liner 26 is flush with the end faces 14c, 14d of the outer ring of the bearing. Alternatively, the insulating liner 26 could receive at least partially the end faces 14c, 14d of the outer ring of the bearing.

In the embodiments shown, the recess or recesses of the socket passes or pass through the radial thickness of the socket 24. Alternatively, the recess or recesses of the socket could be blind. That is, the recesses can be blind recesses rather than through recesses. In another embodiment, the socket could be provided, alternatively or in combination, with the recess or recesses extending in the radial thickness thereof or with one or more recesses extending axially from one of its end faces 24c, 24d.

Moreover, as stated above, in the embodiments shown, the first ring 12 of the bearing is the inner ring and the second ring 14 on which the insulating liner 26 is overmolded is the outer ring. Alternatively, a reverse arrangement could be used in which the second ring 14 on which the insulating liner 26 is overmolded is the inner ring. In this case, the insulating sleeve would be located in the bore 12a of the inner ring. The insulating liner would then be interposed radially between the bore 12a of the inner ring and the outer surface of the socket. In this case, the bore of the socket would delimit the bore of the bearing device.

In the embodiments described, the bearing of the device has a single row of rolling elements. The bearing may as a variant have several rows of rolling elements. Furthermore, the rolling bearing may include other types of rolling elements other than balls, for example rollers. In another variant, the bearing may be a sliding bearing without any rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing devices with integrated electrical insulation.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:
a bearing including a first ring and a second ring mounted for relative rotation; and
an insulating sleeve including a socket and an electrically insulating liner, the socket having at least one recess and the liner having at least one protrusion extending into the at least one recess,
wherein the liner is overmolded on the second ring and the socket to connect the second ring to the socket,
wherein the at least one recess is formed in a cylindrical wall of the socket, and
wherein the at least one recess passes through the cylindrical wall of the socket.

2. The bearing device according to claim 1,
wherein a shape of the at least one protrusion is complementary to a shape of the at least one recess.

3. A bearing device comprising:
a bearing including a first ring and a second ring mounted for relative rotation; and
an insulating sleeve including a socket and an electrically insulating liner, the socket having at least one recess and the liner having at least one protrusion extending into the at least one recess,
wherein the liner is overmolded on the second ring and the socket to connect the second ring to the socket,
wherein the socket has an axial length and is delimited by a first axial end face spaced from a second axial end face, and
wherein the at least one recess extends from the first axial end face toward the second axial end face and has a length less than the axial length of the socket.

4. The bearing device according to claim 3,
wherein the at least one recess comprises at least two discrete, circumferentially spaced recesses.

5. The bearing device according to claim 4,
wherein the at least one recess passes through a cylindrical side wall of the socket.

6. A bearing device comprising:
a bearing including a first ring and a second ring mounted for relative rotation; and
an insulating sleeve including a socket and an electrically insulating liner, the socket having at least one recess and the liner having at least one protrusion extending into the at least one recess,
wherein the liner is overmolded on the second ring and the socket to connect the second ring to the socket,
wherein the socket has an axial length and is delimited by a first axial end face spaced from a second axial end face, and
wherein the at least one recess extends from the first axial end face to the second axial end face.

7. The bearing device according to claim 6,
wherein the at least one recess passes through a cylindrical side wall of the socket.

8. The bearing device according to claim 1,
wherein the socket has an axial length and is delimited by a first axial end face spaced from a second axial end face, and
wherein the at least one recess is located between the first axial end face and the second axial end face and is spaced from the first axial end face and the second axial end face.

9. The bearing device according to any claim 1,
wherein the socket has an axial length and is delimited by a first axial end spaced from a second axial end, and
wherein the socket includes a radially inwardly extending flange at the first axial end in contact with the insulating liner.

10. The bearing device according to claim 1, wherein the socket is made of metal.

11. The bearing device according to claim 1,
wherein the second ring of the bearing has a radial outer surface and a radial inner surface, and
wherein the insulating liner is overmolded on the socket and on the inner and/or outer surface of the second ring.

12. The bearing device according to claim 11,
wherein the socket has an axial length and is delimited by a first axial end face spaced from a second axial end face, and
wherein the liner is overmolded on at least a portion of the first axial end face.
13. The bearing device according to claim 1,
wherein the socket is made of metal, and
wherein the insulating sleeve is connected to the socket and to the second ring by material bonding and/or by an interference fit.
14. An electric motor comprising:
a housing,
a shaft, and
the bearing device according to claim 1 mounted radially between the housing and the shaft.
15. The bearing device according to claim 1,
wherein the at least one recess comprises at least two discrete, circumferentially spaced recesses.
16. The bearing device according to claim 1,
wherein the at least one recess is cylindrical.
17. The bearing device according to claim 1,
wherein the socket has an axial length and is delimited by a first axial end face spaced from a second axial end face, and
wherein the at least one recess extends from the first axial end face toward the second axial end face and has a length less than the axial length of the socket.
18. The bearing device according to claim 1,
wherein the socket has an axial length and is delimited by a first axial end face spaced from a second axial end face, and
wherein the at least one recess extends from the first axial end face to the second axial end face.
19. A bearing device comprising:
a bearing including a first ring and a second ring mounted for relative rotation; and
an insulating sleeve including a socket and an electrically insulating liner, the socket having at least one recess and the liner having at least one protrusion extending into the at least one recess,
wherein the liner is overmolded on the second ring and the socket to connect the second ring to the socket,
wherein the at least one recess has an end opening, and
wherein the end opening is defined by a single closed curve.
20. The bearing device according to claim 19,
wherein the at least one recess passes through a cylindrical side wall of the socket.

* * * * *